Feb. 5, 1946.   C. S. ROBINSON   2,394,106
VIBRATION ABSORPTION SUPPORT
Filed Dec. 21, 1944   3 Sheets-Sheet 1
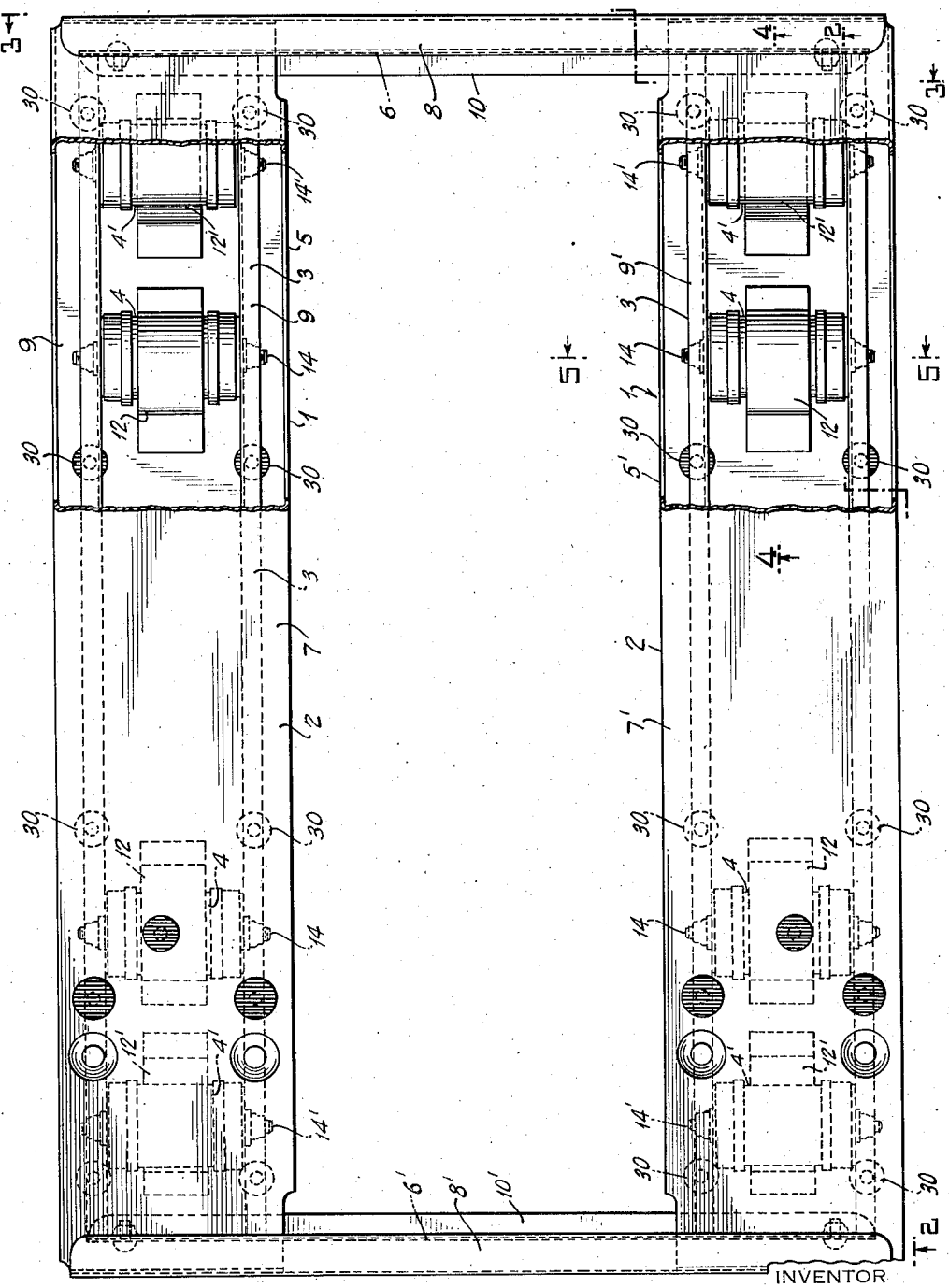
INVENTOR
CECIL S. ROBINSON.
BY
ATTORNEY

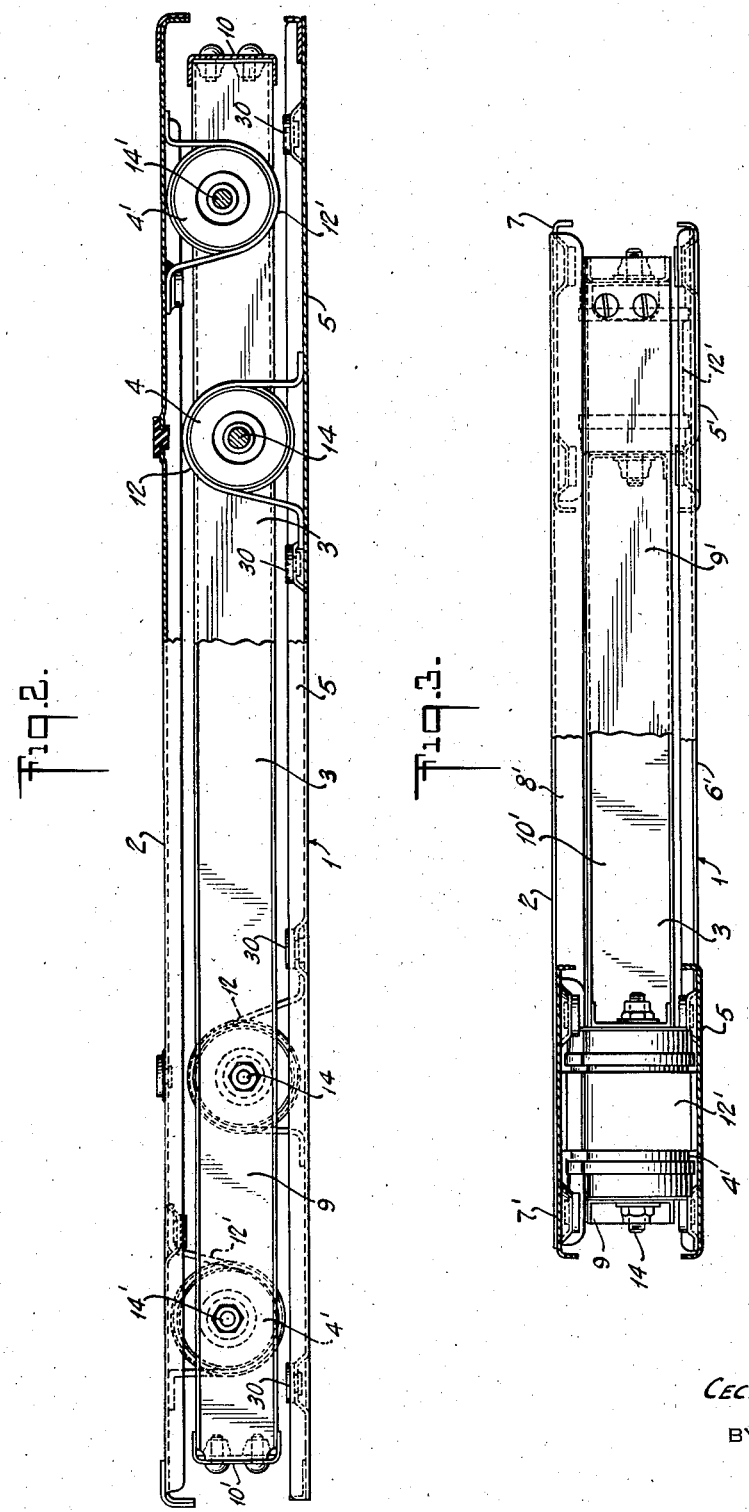

Feb. 5, 1946.     C. S. ROBINSON     2,394,106
VIBRATION ABSORPTION SUPPORT
Filed Dec. 21, 1944     3 Sheets-Sheet 3
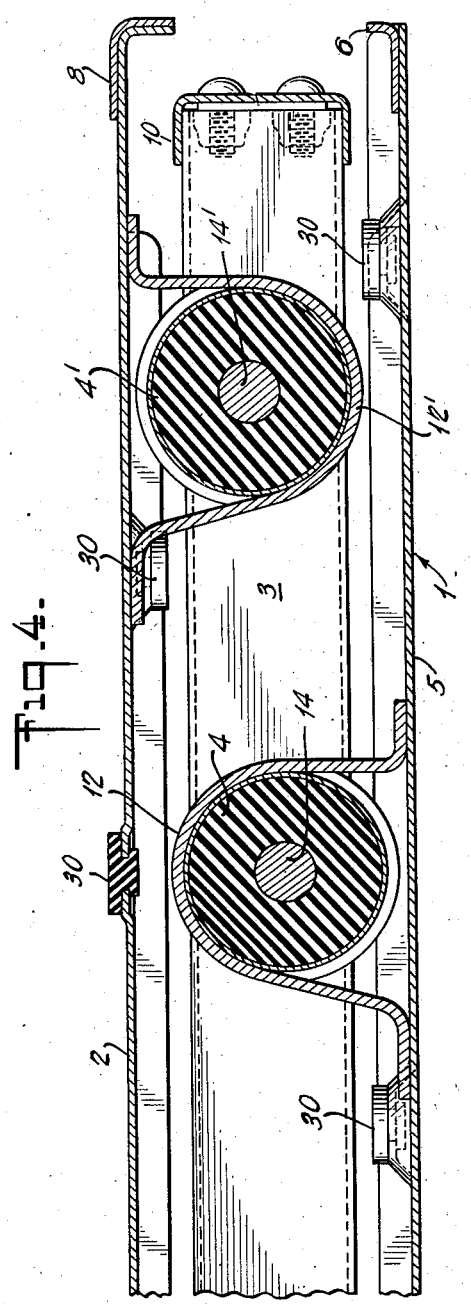
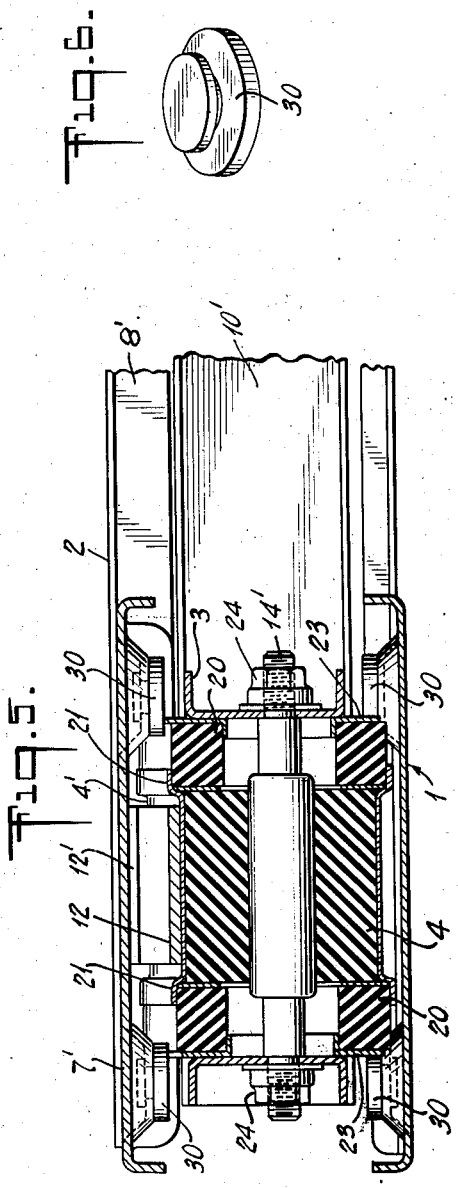
INVENTOR
CECIL S. ROBINSON
BY
ATTORNEY Patented Feb. 5, 1946

2,394,106

UNITED STATES PATENT OFFICE 2,394,106

VIBRATION ABSORPTION SUPPORT

Cecil S. Robinson, New York, N. Y.

Application December 21, 1944, Serial No. 569,185

5 Claims. (Cl. 248—22)

This invention relates to vibration absorbing mounts for supporting delicate apparatus, and it is particularly concerned with the use of sponge rubber or similar material in combination with successive frames so as to prevent the transmission of mechanical vibrations to the protected apparatus and avoid harmonic build-ups in the operating range of frequencies. Another object is to permit the protected apparatus to be suspended from above or supported from below. A further object is not to depend on shearing stresses in the cushions, but instead to use relatively light compression stresses so that full advantage may be taken of the superior vibration absorbing qualities characteristic of spongy materials. Other objects will become apparent as the description proceeds.

The invention is particularly useful in mounting apparatus in airplanes, cars and boats, where visible and invisible mechanical vibrations are continuously present in the vehicle itself under the usual operating conditions. In such installations the continuous vibrations at certain frequencies tend to build up harmonic amplifications—a difficulty with prior mounts which the present invention is adapted to correct. Though primarily intended to meet the exacting conditions of airplane installations, this type of mount can be used to advantage under many other conditions where objectionable vibrations are present.

Referring now to the drawings forming part of this specification,

Fig. 1 is a plan view, partly in section, of the shock mount as seen from above.

Fig. 2 is a side elevation, partly in section on the line 2—2 of Fig. 1, showing end views of the various cylindrical cushions attached to the frames.

Fig. 3 is an end elevation, partly in section, on the line 3—3 of Fig. 1, showing the cylindrical cushions in side elevation, and the connecting frames.

Fig. 4 is a cross-section on the line 4—4 of Fig. 1, showing the cushions in cross-section and on a larger scale.

Fig. 5 is a longitudinal cross-section on the line 5—5 of Fig. 1, showing the cylindrical cushions and annular end cushions on a larger scale.

Fig. 6 is a detail perspective view of the rubber buffer pads or cushions used.

Similar reference numerals refer to similar parts thruout the various views.

As shown in Fig. 1, the mount is generally rectangular in form, and as will be seen more clearly in Fig. 2 and Fig. 3, it is composed of a fixed primary base frame 1 secured to the airplane or other supporting structure, a secondary frame 2 upon which apparatus to be protected from vibration may be carried, and an intermediate floating frame 3 connected to the primary frame 1 and to the secondary frame 2 by elastic cushions 4 and 4' as will be described in detail later.

The primary or base frame 1 is composed of two parallel trays 5 and 5' of similar construction connected at their ends by cross channel pieces 6 and 6' to form a relatively rigid rectangle, proportioned in general according to the form of the apparatus to be carried, so that in some cases it may not be strictly rectangular. The secondary frame 2, to which may be attached such apparatus as is to be protected from vibration, is constructed in general similarly to the base frame 1, though facing it in the opposite direction and having various details and points of attachment of cushions differently located; that is, the secondary frame is also generally rectangular in shape and also consists of two parallel trays 7 and 7' connected at their ends by two cross channel pieces 8 and 8' to form a relatively rigid rectangular structure 2. A general object of the device is to connect the secondary frame structure 2 to the primary base frame 1 in such a manner as to minimize the transmission of vibrations between them. Experience has shown that merely connecting two such frames by rubber cushions does not accomplish the desired result, particularly as regards harmonic peaks, and accordingly under the present invention the following intermediate absorption structure is provided.

This absorption structure consists of an intermediate floating frame 3 composed of parallel side members 9 and 9' which are also connected across their ends by cross pieces 10 and 10' to generally form a rectangular structure. The side members 9 and 9' are located between but spaced from the trays 5 and 7, and 5' and 7', but are elastically connected at certain points to the primary base frame 1 and elastically connected at other points to the secondary frame 2. These elastic or cushion connections will now be more particularly described.

Referring to Fig. 2, it will be seen that attached to the primary base frame 1 are somewhat cylindrical housings 12 containing cylindrical absorption cushions 4 preferably made of sponge rubber or similar material of a porous, spongy or felty nature, having relatively large area and light unit loading as distinguished from heavily compressed solid rubber—the total volume of the spongy cushions 4 being sufficient to support the load and still retain relatively free elasticity of movement. Two of these cushions 4 are secured to the tray 5 and two others similarly to the tray 5' of the same primary frame 1. Centrally thru these cushions 4 extend bolts 14 attached to the intermediate floating frame 3. The cushions are shown on a larger scale in Fig. 4 and Fig. 5.

A similar set of cushions 4' are contained in housings 12' secured to the secondary frame 2, and in these cushions 4' are contained similar bolts 14' which are also attached to the intermediate floating frame 3, but the latter points of attachment are considerably different in their distance from the middle point or neutral axis of the frame 3, so that the natural resonance periods at the bolts 14 and 14' are considerably different. This difference in spacing also permits a nesting of the cushions in such a way as not to increase the distance between the primary and secondary frames 1 and 2 but little more than it would be if only one set of cushions were used. In many installations compactness is highly desirable, if not essential.

By referring to Fig. 3 and particularly Fig. 5 it will be seen that the cushions 4 (and similarly 4') are not only thick radially but also rather long in an axial direction. This permits a relatively light loading of the cushioning material which is thereby allowed to be flexible enough to permit some displacement of the central bolt in all directions, and also tilting of the bolt in vibrating to positions out of parallel to its normal position if required. Though the mount is thus adapted to receive periodic vibrations of different types from all directions, it will be noted that the vibrations are not likely to progress thru the system without encountering some part at which they are not in natural resonance—the resonance periods about the inner cushions being different from those of the outer cushions. Moreover, the lightly compressed spongy materials do not have the high resonance periods frequently found objectionable in solid cushions.

While normally the load or incoming vibrations are transverse to the direction of the bolts 14, it will be seen in Fig. 5 that cushions 20 are also provided near the ends of the bolts 14 to take care of thrusts or vibrations in axial directions relative to the bolts 14. These cushions 20 are held in cups 21 formed on the ends of the housing 12, while the bolt ends carry complementary cups or rings 23 bearing on the other sides of the cushions 20. The cushions 20, like the cushions 4 and 4', are thick and spongy. Adjustable nuts 24 on the ends of the bolts 14 permit any desired initial degree of compression to be applied. All cushions are sufficiently held in place by the mechanical structure around them so that they need not be cemented or otherwise bonded to the metal. This permits the ready replacement of the cushions and also permits better control of the quality of the vibration absorbing material.

In normal operation the frames 1, 2 and 3 do not touch each other; and vibrations attempting to pass between them are intercepted by the sponge rubber cushions as described. However, rubber buffers 30 are provided at points where the frames 1, 2 and 3 might contact each other under conditions of excessive vibration or shock, so that the mount may not be damaged by abnormal conditions and also to avoid any possible metal to metal contact.

It will be noted that in the construction described the main pivotal bolts 14 and 14' are effectively surrounded on all sides by spongy cushioning material, both circumferentially and at the ends, so that the mount may be placed in any position, vertically or horizontally, and still protect the mounted apparatus from vibration. The floating intermediate frame 3 plays an important part in reducing the vibrations and preventing harmonics, particularly as the designer is free to adjust the relative locations of the supporting bolts if certain harmonics become excessive.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

What I claim is:

1. In a vibration absorbing mount, the combination of a primary base frame, a secondary load carrying frame, an intermediate floating frame between the base frame and the secondary frame, cylindrical cushions of spongy elastic material mounted on the base frame on the side facing the secondary frame at spaced locations, cylindrical cushions of spongy elastic material mounted on the secondary frame on the side facing the base frame but at different spaced locations so as to avoid widening the space between the primary and secondary frames and provide different harmonic periods, bolts extending approximately parallel to the plane of the base and passing axially thru the cylindrical cushions so as to be supported thereby, said bolts being attached to the intermediate floating frame, whereby vibrations entering the mount from the base frame must pass successively thru cylindrical cushions, bolts, floating frame, and differently spaced bolts and cylindrical cushions, before any residue may reach the secondary frame.

2. In a vibration absorbing mount, the combination of a primary base frame, a secondary load carrying frame, an intermediate floating frame between the base frame and the secondary frame, cylindrical cushions of spongy elastic material mounted on the base frame on the side facing the secondary frame at spaced locations, cylindrical cushions of spongy elastic material mounted on the secondary frame on the side facing the base frame but at different spaced locations so as to avoid widening the space between the primary and secondary frames and provide different harmonic periods, bolts extending approximately parallel to the plane of the base and passing axially thru the cylindrical cushions so as to be supported thereby, said bolts being attached to the intermediate floating frame, and buffer cushions limiting extreme vibration of the intermediate frame, whereby vibrations entering the mount from the base frame must pass successively thru cylindrical cushions, bolts, floating frame, and differently spaced bolts and cylindrical cushions before any residue may reach the secondary frame.

3. In a vibration absorbing mount, the combination of a primary base frame, a secondary load carrying frame, an intermediate floating frame between the base frame and the secondary frame, cylindrical cushions of spongy elastic material mounted on the base frame on the side facing the secondary frame at spaced locations, cylindrical cushions of spongy elastic material mounted on the secondary frame on the side facing the base frame but at differently spaced locations so as to avoid widening the space between the primary and secondary frames and provide different harmonic periods, bolts extending approximately parallel to the plane of the base and passing axially thru the cylindrical cushions so as to be supported thereby, said bolts being attached to the intermediate floating frame, heads on the bolts, and end thrust cushions of spongy elastic material between said heads and the cylindrical cushions previously mentioned, whereby vibrations entering the mount from the base frame must pass successively thru cushions, bolts, floating frame, and differently spaced bolts and cushions before any residue may reach the secondary frame.

4. In a vibration absorbing mount, the combination of a primary base frame, a secondary load carrying frame, an intermediate floating frame between the base frame and the secondary frame, cylindrical cushions of spongy elastic material mounted on the base frame on the side facing the secondary frame at spaced locations, cylindrical cushions of spongy elastic material mounted on the secondary frame on the side facing the base frame but at differently spaced locations so as to avoid widening the space between the primary and secondary frames and provide different harmonic periods, bolts extending approximately parallel to the plane of the base and passing axially thru the cylindrical cushions so as to be supported thereby, said bolts being attached to the intermediate floating frame, heads on the bolts, end thrust cushions of spongy elastic material between said heads and the cylindrical cushions previously mentioned, and buffer cushions limiting extreme vibration of the intermediate frame, whereby vibrations entering the mount from the base frame must pass successively thru cylindrical cushions, bolts, floating frame, and differently spaced bolts and cushions before any residue may reach the secondary frame.

5. In a vibration absorbing mount, the combination of a primary base frame comprising a pair of parallel trays, a secondary load carrying frame comprising a pair of parallel trays, an intermediate floating frame having parallel portions and located between the base frame and the secondary frame, cylindrical cushions of spongy elastic material mounted on the base frame on the side facing the secondary frame at spaced locations, cylindrical cushions of spongy elastic material mounted on the secondary frame on the side facing the base frame but at differently spaced locations so as to avoid widening the space between the primary and secondary frames and provide different harmonic periods, bolts extending approximately parallel to the plane of the base and passing axially thru the cylindrical cushions so as to be supported thereby, said bolts being attached to the intermediate floating frame, heads on the bolts, end thrust cushions of spongy elastic material between said heads and the cylindrical cushions previously mentioned, and buffer cushions limiting extreme vibration of the intermediate frame, whereby vibrations entering the mount from the base frame must pass successively thru cushions, bolts, floating frame, and differently spaced bolts and cushions before any residue may reach the secondary frame.

CECIL S. ROBINSON.